United States Patent [19]  [11]  4,049,601
Anderson  [45]  Sept. 20, 1977

[54] MOISTURE-RESISTANT POLYURETHANE-BASED PRESSURE-SENSITIVE ADHESIVES

[75] Inventor: Ralph L. Anderson, Columbia, S.C.

[73] Assignee: Anchor Continental, Inc., Columbia, S.C.

[21] Appl. No.: 618,512

[22] Filed: Oct. 1, 1975

Related U.S. Application Data

[62] Division of Ser. No. 443,917, Feb. 19, 1974, Pat. No. 3,940,513.

[51] Int. Cl.² .............................................. C08L 93/00
[52] U.S. Cl. ................................. 260/24; 260/18 TN; 260/32.6 NR; 260/77.5 CR; 260/77.5 AB
[58] Field of Search ............. 260/24, 32.6 NR, 18 TN

[56] References Cited

U.S. PATENT DOCUMENTS 3,246,049  4/1966  Webber .................................. 260/829

Primary Examiner—Melvyn I. Marquis

[57] ABSTRACT

Moisture-resistant, polyurethane-based, pressure-sensitive adhesives.

9 Claims, No Drawings

MOISTURE-RESISTANT POLYURETHANE-BASED PRESSURE-SENSITIVE ADHESIVES

This is a division of application Ser. No. 443,917, filed Feb. 19, 1974, and now U.S. Pat. No. 3,940,513.

In U.S. Pat. Nos. 3,437,622 and 3,761,307 and U.S. Patent Application Ser. No. 323,944, filed Jan. 15, 1973 and now abandoned, are disclosed pressure-sensitive adhesives, the required cohesive strength of which is provided by a polyurethane polymer in place of the natural or synthetic rubber of the prior art. However, some such polyurethane-based adhesives are not highly resistant to moisture unless special procedures are used. For example, they may occasionally lose 20 to 75% of their adhesiveness after exposure for 3 days or less at 90% relative humidity and 150° F. This invention discloses polyurethane-based, pressure-sensitive adhesives which under such conditions consistently lose only 5 to 10% or less of their initial adhesion. Such moisture-resistance is important where the adhesive is stored or used under humid conditions.

The following Examples illustrate detailed procedures for making my new adhesives, modifications and extensions of which within the scope of the appended claims, will be evident to those skilled in the art. (All proportions and amounts herein given are by weight unless otherwise noted.)

EXAMPLE 1

A. The polyoxypropylene ether of glycerin of molecular-weight (mw) 3000 hydroxyl number 35 is mixed with tolylene diisocyanate (commercial material containing 80% 2,4 and 20% 2,6 isomers) in proportion to give a ratio of the number of equivalents of hydroxyl (OH) to isocyanate (NCO) of 1:1.5. The mix is heated for 4 hours at 250° F. and kept from exposure to moisture in the air or elsewhere.

B. A hydroxylated elastomer, polybutadiene of OH number 45, viscosity 200 poises at 30° C., 7.5 lbs./gal., iodine no. 355, 60% trans, 20% cis (1-4), 20% vinyl (1-2), dissolved in 20% of its weight of toluene is mixed with tolylene diisocyanate (TDI) in the proportion to give a ratio of OH:NCO of 1:1.5 and the mix heated for 4 hours at 250° F. protected from moisture.

10% of B by weight is blended with 90% of A. Tackifying resins in the form of the ethylene glycol ester of hydrogenated rosin and the triethylene glycol ester of hydrogenated rosin, each in amount of 25% of the weight of polyol plus elastomer are dissolved to a 70 weight % solution in toluene and added to the blend. Use of solvent slows the reaction and increases the pot-life of the prepolymers. Catalyst is then added in the form of stannous octoate in the amount of 1% of the weight of the 2 prepolymers. The mix is then coated on a polyurethane-impregnated paper (see U.S. Pat. Nos. 3,702,781; 3,752,700; 3,778,302; and U.S. Patent Applications Ser. Nos. 236,956, filed Mar. 22, 1972 and 323,944 both abandoned) in amount to yield a final, dry coating-weight of 5 grams/sq.ft. The so-coated paper is heated for ½ to 1½ minutes at 325° F. The product was a tacky, pressure-sensitive (ps) adhesive tape which lost only 5% of its initial adhesiveness after 3 days exposure to 90% relative humidity at 150° F.

EXAMPLE 2

The procedure of Ex. 1 was followed, except that polyoxypropylene (the ethylene oxide adduct of polypropylene glycol) of OH no. 56 and mw 2000 was used in place of the polyoxypropylene ether of glycerin. A similar moisture-resistent tape was produced.

EXAMPLE 3

The procedure of Ex. 1 was used, except that in part B, the hydroxylated polybutadiene was replaced by a styrene-butadiene copolymer with 20% styrene, 80% butadiene, OH no. 42, 60% trans, 20% cis (1-4), 20% vinyl (1-2), viscosity 295 poises at 30° C,. 7.6 lbs./gal., iodine no. 335. A similar product was produced.

EXAMPLE 4

The procedure of Ex. 1 was followed, except that in part B, the hydroxylated polybutadiene was replaced by an acrylonitrile copolymer with 15% acrylonitrile and 85% butadiene, OH no. 39, 60% trans, 20% cis (1-4) 20% vinyl (1-2), viscosity 500 poises at 30° C., 7.7 lbs./gal., iodine no. 345. A similar product was produced.

EXAMPLE 5

The procedure of Ex. 3 was used, except that in part A, the polyoxypropylene ether of glycerin was replaced by the ethylene oxide adduct of polypropylene glycol, OH no. 56, mw 2000. A similar result was yielded.

EXAMPLE 6

The procedure of Ex. 1 was followed and to the final blend of parts A and B was added 2% of the weight of solids therein, of hexamethylene tetramine (HT). The product had increased moisture-resistance, losing inappreciably in adhesion after the humidity test.

It is found generally that addition of 0.6 to 5% HT based on total prepolymer wt., used as in Ex. 6, increases the moisture-resistance. In case the polyol polymer (as in part A of Ex. 1) contains moisture, the curability of the adhesive suffers but unless the moisture content in high this can be overcome by heating the polymer for about 30 minutes at 150° to 200° F.

EXAMPLE 7

This is an example of a one-step procedure to make an excellent moisture-resistant ps adhesive without the use of solvent. The procedures are carried out with exclusion of moisture. 90 parts of the propylene oxide adduct of trimethylol propane of mw 2000 and OH no. 56, are warmed to 200° to 220° F. in order to dissolve therein 27 parts of the triethylene glycol ester of hydrogenated rosin and 27 parts of the glycerol ester of hydrogenated rosin. With this solution is mixed 10 parts of the hydroxylated polybutadiene of Ex. 1, 2 parts of stannous octoate catalyst, TDI and polymethylene polyphenyl diisocyanate (WUC) in proportions to give a ratio of equivalents of total NCO to total OH of 1.5:1, the TDI supplying 80% of the NCO and the WUC 20%. There is then mixed in 2 parts HT and the final mix promptly coated on the impregnated backing of Ex. 1 and heated at 250° to 270° F. for 1 to 2 minutes. An excellent moisture-resistant ps adhesive tape was obtained.

The other herein disclosed hydroxylated elastomers may be used in the Examples in place of the polybutadiene. Other well-known catalysts of activity equal to that of stannous octoate can be used, such as stannous neodecanoate and lead octoate. If backings impregnated with natural rubber or synthetic rubber latices or solutions are used, the amount of polyisocyanate is increased to react with the active hydrogen of the impregnant and backing. If the WUC is not used (TDI alone), for example as in Ex. 7, the cure requires at least 2 minutes at over 300° F. but the pot-life of the mix is longer; it requires only about 4 seconds at 340° F. or 20 sec. at 180° F. if WUC alone is used and the pot-life is shorter. The hydroxylated elastomer polymer, as in part B of Ex. 1, may be used in the amount of 6 to 25% of the weight of the blend, the preference being for about 10%. A satisfactorily moisture-resistant product can also be made using the part B prepolymer without the part A prepolymer of Ex. 1, but the cure is slower, the adhesive has lower shear resistance, the resistance to high temperature is lower and the elastomer is more expensive. The blend of Ex. 1 can be used directly after mixing but the final adhesive is improved by letting the blend stand for 24 to 48 hrs. at room temperature or by heating for 3 to 5 hrs. at 150° F. The polyol reaction-product, as in Ex. 1, part A, may also be kept at room temperature for 24 to 48 hrs. out of contact with moisture with resulting improvement.

Tackifying resin may be used in amount of 40 to 150%, preferably about 50%, of the weight of the prepolymers used. Preferably the resins should have an acid no. below about 15 (otherwise enough additional NCO is used to react with the active hydrogen in them) and may be esters of rosin, tall oil, hydrogenated rosin polymerized rosin or rosin stabilized by heating with a small amount of iodine (known in the trade as "Galex") or the cheaper resins such as the diethylene glycol esters of petroleum aromatic residues. Such esters may also be of ethylene glycol, glycerol or pentaerythritol. 10 to 40 (preferably 25) wt. per cent of the resin may be of low mw. Examples of low mw resins are the diethylene glycol and methyl esters of rosin, tall oil or hydrogenated, polymerized or stabilized rosin; of high mw are the glycerol and pentaerythritol esters of rosin, tall oil and hydrogenated polymerized or stabilized rosin. Resins of melting-point 100° to 122° C. I consider to be of high mw and are slightly less compatible, i.e. are not largely soluble in the solvent or in my polyols. Such resins are added either in solution in the warm polyols or dissolved, for example in toluene or tolyene diluted with up to about 30% heptane, to about 70% concentration, The solvent also slows the reaction and lengthens the pot-life. I have found, however, that I can use a single resin of m.p. 74°-122° C. (preferably 100°-122°), for example pentaeryth ritol esters as noted above, with improved high temperature resistance. As in Ex. 2, the polyoxypropylene may be the propylene oxide adduct of polypropylene glycol. The polyol, as in Ex. 1 or 2, part A, can vary in mw from 1500 to 5000, but 3000 to 4500 is preferred. The polyol OH no. can vary between 30 and 100, but 35 to 50 is preferred. The hydroxylated elastomers, as in Ex. 1, part B are all liquids at room temperature and, although those of the Examples are preferred, they may also include hydroxylated polyisoprene and hydroxylated natural rubber. Their OH nos. may vary from 20 to 60, 39 to 56 being preferred; their viscosities, densities and iodine nos. may vary plus or minus 5% and their proportions of trans, cis and vinyl may vary from 57-63, 19-21 and 19-21, respectively. The per cent styrene in the hydroxylated butadiene-styrene can vary from 20-40; and of acrylonitrile in acrylonitrile-butadiene from 13 to 17%.

The catalysts, as used in Ex. 1, may be the usual polyurethane catalysts such as stannous octoate and neodecanoate and lead octoate, and others of roughly equal activity. They are used in amounts from 0.3 to 5% of the total weight of prepolymers, preferably about 1%.

The adhesive is coated on the backing in amount from 3 to 11 grams per sq. ft. dry solids. The curing with polyols of OH no. 30–41 may be from ½ to 1½ min. at 310° to 350° F. while those of OH nos. from 41 to 50 are cured at 250° F. for 1 to 1½ min. or for ½ min. at 350° F. When using polyols of higher OH nos., a satisfactory product may be made without preheating and without HT if kept dry but when using those of lower OH no., the preheating is required. In any case the use of HT improves the moisture-resistance. Preheating is not needed when moisture is excluded although this is a wise precaution as is standing at room temperature for 24-48 hrs.

I classify the polyols I use as of high, intermediate or low OH no. — those of about 41 to 100 are high and react faster with NCO and are cured for about ½ min. at 350° F. or 1 -1½ min. at 250° F. while those of 30 to 41 are low and the prepolymers from them often need to be preheated before use, for example, for 30 minutes at 150° to 200° F. The latter are cured, for example, for ½ to 1½ min. at 310° to 350° F. The prepolymers from polyols of high OH nos. can be cured without preheat and, if kept dry, do not need HT, while those from low OH no. polyols usually have HT added. The polyols of low OH no. give more tacky final adhesive. Inert, volatile solvents other than toluene can be used, especially 30% heptane in toluene.

The backing materials used are as in Ex. 1 and are best those containing polyurethane polymers attached through urethane linkages to NCO—reactive hydrogen (active hydrogen) contained in the backing, and, of course, must be reasonably stable at the temperature I use. If required, the backings can be provided with well-known release coatings on the backside and with anchor- or tie-coatings on the side coated with adhesive. Release-coatings include about 0.1 mil thick silicones, polyvinyl carbamate (U.S. Pat. No. 2,532,011), acrylate copolymers, polyvinyl behenate, vinyl stearate and maleic or acrylic anhydride. Tie-coats include treating the surface to corona discharge (especially with film backings) or coating with emulsions of neoprene or butadiene-styrene rubber and tackifying resin. If barrier coatings are needed, for example to prevent migration of adhesive and backing components, there can be used 0.3 to 0.4 mil coatings of cross-linking acrylic copolymer, polyvinyl chloride copolymer or a toluene, xylol or xylol-mineral spirits solution containing 50% alkyd resin comprising phthalic acid-glycerin ester with 50% melamine-formaldehyde resin the ester containing 20% soybean oil or linoleic acid and using 0.5 to 1% paratoluene sulfonic acid as resin condensation catalyst. Other backings may include impregnated cloth, glass-cloth, rayon, nylon, cellulose ethers and esters, polyesters, silk, polyethylene, polypropylene, polybutylene, polyvinyl esters and ethers, polyvinyl alcohol and partially hydrolyzed polyvinyl and cellulose ester. In order to save adhesive it is best to impregnate porous backings.

Having thus described my invention, what I claim is:

1. A moisture-resistant, polyurethane-based, pressure-sensitive adhesive comprising a substantially uniform mixture of: (1) the reaction-product of 1.7 to 1.1 equivalents of an aromatic polyisocyanate and 1 equivalent of polyols of molecular-weight between 1500 and 5000 and hydroxyl number between 30 and 100; (2) the reaction-product of 1.7 to 1.1 equivalents of an aromatic polyisocyanate and 1 equivalent of a liquid hydroxylated elastomer of hydroxyl number between 20 and 60 in the amount of between 6 and 25 percent of the combined weight of the products of (1) and (2); (3) compatible tackifying resins in the amount of 40 to 150 percent of the combined weight of the products of (1) and (2) and selected from the class consisting of (a) the methyl, triethylene glycol and diethylene glycol esters of rosin, tall oil, hydrogenated rosin and stabilized rosin and (b) the glycerol and pentaerythritol esters of rosin, tall oil, hydrogenated and stabilized rosin; the proportions of the resins of (a) and (b) being between 10 and 40 percent of the combined weight of (a) and (b) resins; (4) active polyurethane catalyst in the amount of between 0.3 and 3 per cent of the combined weight of (1) and (2).

2. The product of claim 1 wherein the said polyols of (1) are of molecular-weight between 3000 and 4500 and of hydroxyl number between 35 and 50; the said hydroxyl number of the said elastomer of (2) is between 39 and 56 and the said amount is 10 per cent; the said amount of the tackifying resins of (3) is 50 percent and the said proportion of the resins of (a) is equal to that of the resins of (b); and the amount of the catalyst of (4) is 1 percent.

3. The product of claim 1 which additionally contains between 0.6 and 5 percent of the combined weight of the products of (1) and (2) of hexamethylene tetramine.

4. The product of claim 1 wherein the said polyisocyanate of (1) and (2) is selected from the class consisting of tolylene diisocyanate, polymethylene polyphenyl diisocyanate and mixtures of same and the equivalents of total isocyanate of (1) and (2) are 1.5 to 1 equivalent of total hydroxyl of (1) and (2).

5. The product of claim 1 wherein the said resin of step (3) is selected from the class consisting of esters of tall oil, rosin, polymerized rosin, stabilized rosin and hydrogenated rosin, said resin having an acid number not over 15 and a melting-point between 74° and 122° C.

6. The product of claim 5 wherein the said melting-point is between 100° and 122° C.

7. The product of claim 5 wherein the product of the said step (4) of claim 1 is allowed to stand at room temperature for from 24 to 48 hours before use.

8. The product of claim 5 wherein the product of the said step (4) of claim 1 is heated for from 3 to 5 hours at about 250° F. protected from moisture before proceeding to the said step (5).

9. The product of claim 1 wherein there is added to the said step (4), 0.6 to 5 percent of the combined weight of polyurethane polymers therein, of hexamethylene tetramine.

* * * * *